April 9, 1957  H. L. BIEN  2,787,922
METHOD OF MAKING CUTTING DIES
Filed Nov. 28, 1955  2 Sheets-Sheet 1

INVENTOR.
Howard L. Bien
by
ATTORNEY

April 9, 1957 H. L. BIEN 2,787,922
METHOD OF MAKING CUTTING DIES
Filed Nov. 28, 1955 2 Sheets-Sheet 2
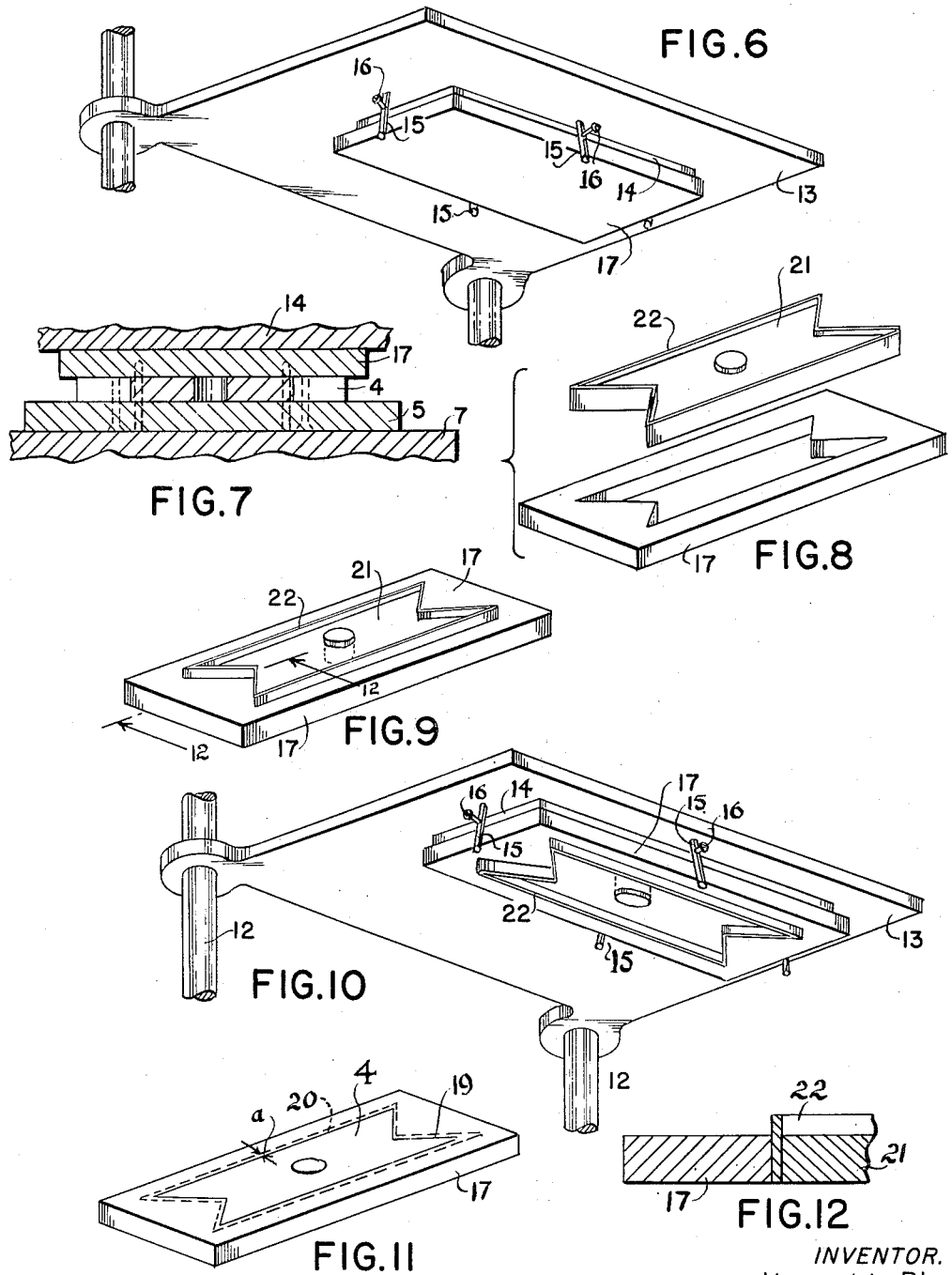
INVENTOR.
Howard L. Bien
by *Ernest Montague*
ATTORNEY United States Patent Office
2,787,922
Patented Apr. 9, 1957

2,787,922
METHOD OF MAKING CUTTING DIES

Howard L. Bien, Flushing, N. Y.

Application November 28, 1955, Serial No. 549,304

2 Claims. (Cl. 76—107)

The present invention relates to a method of making cutting dies to be used in working on sheet material and is designed particularly for production of a limited number of punchings of irregular outline.

A method of making a device for punching sheet metal has been proposed before which consists in cutting an opening in a die block having the contour of the desired punching, then bending blade means in strip form to make cutting edges and fitting them around the inside of the opening in the die block, pressing a smaller block of the same contour into the space enclosed by the blades, fastening a punch plate to a base plate, pressing the cutting edges of the blades into the punch plate to mark off the desired contour thereon, removing the marked punch plate from the base plate, trimming the punch plate to the marked outline of the contour, and finally returning and fastening the trimmed punch plate to the base plate. While this known method brought about an improvement over the conventional die making process, particularly for the use of a limited number of punchings, the results were not satisfactory in many instances, because this known method could provide for the thickness of the sheet metal to be worked by trial and error only and, therefore, created difficulties in the punching of the sheet metal.

It is, therefore, one object of the present invention to provide a method of die making in which the size of the punch as well as that of the cutting blades is dimensioned in such manner that it may be varied in accordance with the thickness of the sheet material to be worked.

It is another object of the present invention to provide a method of making cutting dies which permits the manufacture of a die at extremely low cost without jeopardizing the precision necessarily required in the making of a die.

With these and other objects in view which will become apparent in the following detailed description, the present invention will be clearly understood in connection with the accompanying drawings, in which:

Fig. 6 is a bottom perspective view of the upper plate of the die set of the press;

Fig. 7 is a fragmentary elevation of the engaging wood block of the upper die set with the punch of the lower die set;

Fig. 8 is a perspective exploded view of the wood block and its centerpiece, the latter surrounded by the knives;

Fig. 9 is a top perspective view of the assembled wood block in knife clamping position;

Fig. 10 is a bottom perspective view of said upper die set of the press having the block shown in Fig. 9 mounted thereon in reverse position;

Fig. 11 is a plan view of the wood block having the punch mounted thereon; and

Fig. 12 is a fragmentary section along the lines 11—11 of Fig. 9.

Figure 1:
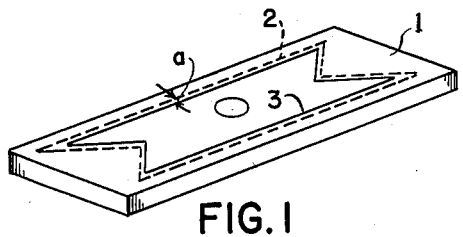
Figure 1 is a top perspective view of a tool steel block.

Referring now to the drawings, and in particular to Figs. 1 to 5, at first the punch of the perimeter and the required internal shapes is prepared by marking on a tool steel plate 1 the outline of the shape to be punched out of sheet material, which shape is indicated by the dotted line 2, whereupon a second outline shown in full lines 3 is marked on top of the tool steel block, the distance between the dotted lines 2 and the full lines 3 being determined by the thickness of the sheet material to be worked and thus may vary in the preparation of the punch for material of different thickness. By this arrangement the previous trial and error method for arriving at the right size of the punch is replaced by a method permitting highest precision because the known thickness of the sheet material to be worked can be considered to a very high degree in setting up the inner lines 3 on the tool steel plate which will determine the exact size of the punch.

Figure 2:
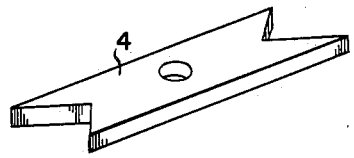
Fig. 2 is a top perspective view of the punch cut out from said tool steel block.
Figure 3:
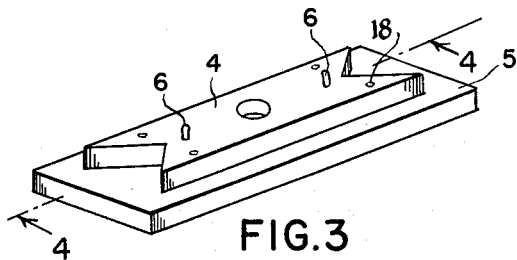
Fig. 3 is a top perspective view of the punch mounted on the base plate.
Figure 4:
Fig. 4 is a section along the lines 4—4 of Fig. 5.

After this preliminary step the punch 4 is cut out by any conventional means from the tool steel plate 1 and upon obtaining the punch 4, as shown in Fig. 2, the latter is mounted on a base plate 5 preferably of steel by screwing the punch 4 and the base plate 5 together. In addition locating pins 6 extend through both, namely the base plate 5 as well as the punch 4, which locating pins 6 project above the top face of the punch 4.

Figure 5:
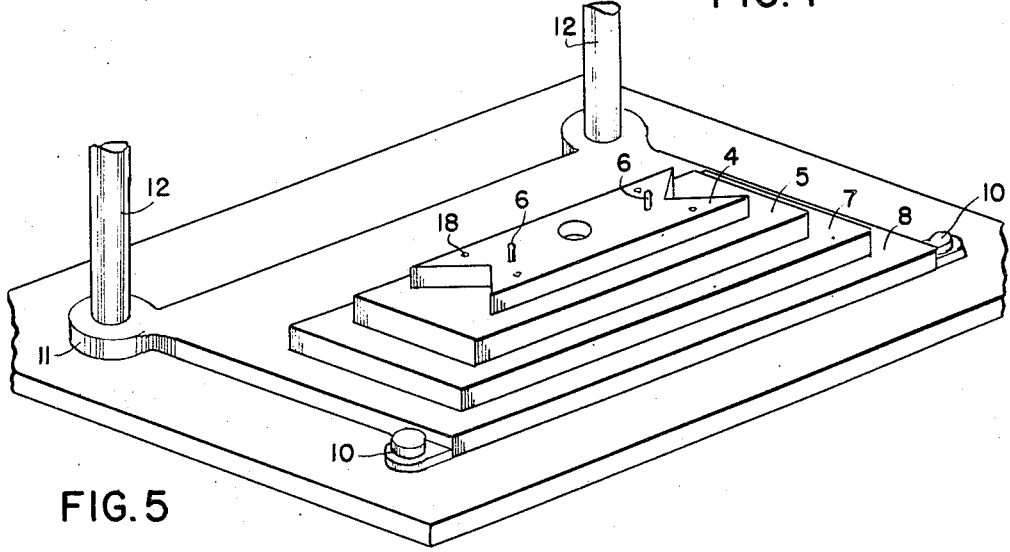
Fig. 5 is a top perspective view of the bed of the press with the die set base and punch mounted thereon.

As clearly indicated in Fig. 5 the punch 4 together with the base plate 5 are then mounted on a foundation block 7 of a press, which foundation block 7 rests on a die set base 8 of the press which in turn is mounted on the bed 9 of the press. The die set base is secured to the bed of the press in conventional manner by tie down bolts 10 disposed preferably at two corners thereof, while the other two corners have ear formations 11 from which the uprights 12 of the press project in upward direction.

The thus prepared punch 4 is used for the preparation of the complementary die and in this connection reference is made to Figs. 6 to 11 of the drawings.

As clearly shown in Figs. 6 and 7, the upper part of the die set comprises an upper plate 13 and a steel block 14 is secured to the bottom base of said top plate. A plurality of steel lockplates 15 engage the side faces of the steel block 14, which steel lockplates may be grippingly adjusted by means of screw bolts 16 secured into the side faces of the steel block 14. The steel lockplates are adapted to grip a wood block 17 in position in which the wood block 17 engages the bottom face of the steel block 14.

The ram of the press and, thereby, the upper plate 13 of the die set together with the steel block 14 and the wood block 17 is then lowered towards the lower die set until the top face of the punch 4 (Fig. 5) engages the bottom face of the wood block 17. During this lowering movement of the upper die set the locating pins 6 projecting from the punch 4 will penetrate the wood block 17 and locate the position of the latter relative to the punch 4. The screw bolts 16 are now loosened and upon lifting the ram of the press against the steel block 14 is moved in upward direction leaving the wood block 17 in engaging position with the punch 4 as shown in Fig. 7. The base plate 5, the punch 4 and the wood block 17 are then removed from the foundation block 7 whereupon the screws 18 are removed from the base plate 5 and the punch 4 and the wood block 17 removed from the base plate 5.

The outline of the punch 4 as well as any internal shapes are then carefully marked on the wood block 17 as shown in Fig. 11 as a full line 19. A second line shown as dotted line 20 is then marked on the wood block 17, which dotted line 20 is spaced apart from the full line 19 a distance which is directly related to the thickness of the sheet material to be worked. A centerpiece conforming exactly to the shape of the body to be worked from the sheet material is cut along the dotted line 20 from the wood block 17, and in order to maintain the precision a saw blade is used in cutting out the centerpiece 21, the thickness of which saw blade is exactly identical with the thickness of steel rule knives 22 which are disposed between the wood block 17 and the centerpiece 21 upon reinsertion of the latter into the wood block 17. The steel rule knives 22 are at first set around the circumference of the centerpiece 21 before inserting the latter into the wood block 17. The steel rule knives 22 project now above the surface of the block 17 and its centerpiece 21, as clearly shown in Fig. 9 of the drawings and the steel rule knives 22 are now mounted in such manner that they conform exactly with the size of the body to be worked from the sheet material.

The wood block 17 carrying the steel rule knives 22 is then reversed and secured to the upper plate 13 of the upper die set of the press in the same position relative to the upper plate as before during the die forming process, as clearly indicated in Fig. 10 of the drawings.

Upon mounting the punch 4 again on the base plate 5 in the lower die set of the press the sheet material may now be fed into a position above the punch so that upon lowering the ram and, thereby, the upper die set of the press the sheet material will be properly worked, the forming of the sheet material taking place by an overlapping stroke of the knives 22 over the punch 4.

While I have disclosed one embodiment of the present invention, it is to be understood that this embodiment is given by example only and not in a limiting sense, the scope of the present invention being determined by the objects and the claims.

I claim:

1. A method of making a device for punching sheet material comprising the steps of cutting a punch member having the predetermined contour of the punching reduced in size for an amount directly related with the thickness of the sheet material to be punched out of a plate, mounting said cut out punch member on a base plate, providing coinciding holes in said punch member and in said base plate, inserting locating pins of a length greater than the combined thickness of said punch member and of said base plate into said holes, pressing said punch member toward a wood block of a size larger than said punch member and simultaneously pushing said locating pins into said wood block in order to locate said punch member relative to said wood block, marking the outline of said punch member on the top face of said wood block and cutting out a centerpiece of said wood block along a line spaced apart outwardly from said outline of said punch member for an amount directly related with the thickness of the sheet material to be worked, fitting cutter blade means around said centerpiece and inserting the latter into said wood block, thereby clamping said cutter blade means in said wood block, and then mounting said punch member and said wood block with said cutter blade means, respectively, on respective upper and lower die sets of a press in proper cooperative punching position.

2. The method, as set forth in claim 1, in which said step of cutting out a centerpiece of said wood block is performed with a saw blade of a thickness identical with that of said blade means, in order to provide an exact fitting of said cutter blade means in said wood block.

No references cited.